May 26, 1953 G. T. SCHWARZMANN 2,639,455
ROTARY WINDSHIELD WIPER
Filed Oct. 3, 1947 2 Sheets-Sheet 1

Inventor
Gustav T. Schwarzmann
By Randolph & Beavers
Attorneys

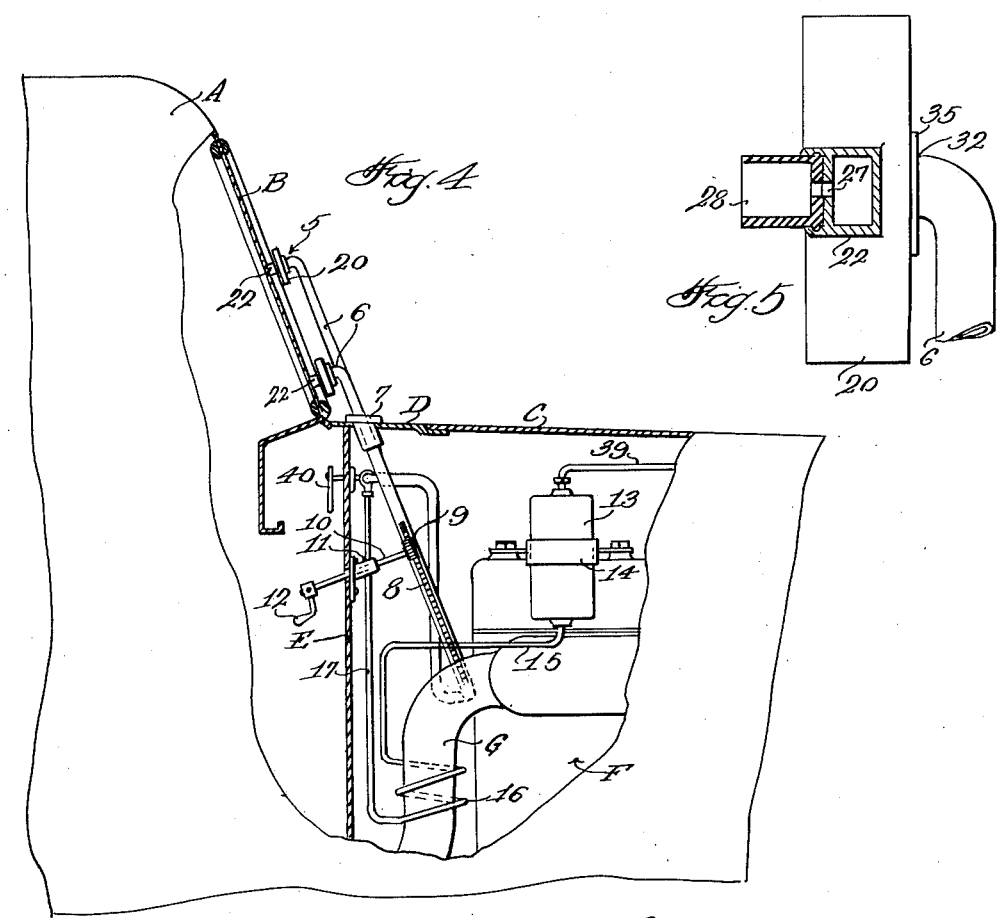
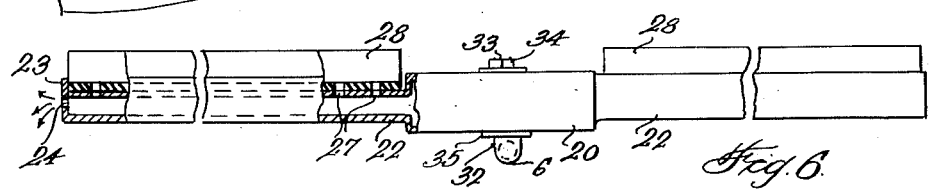
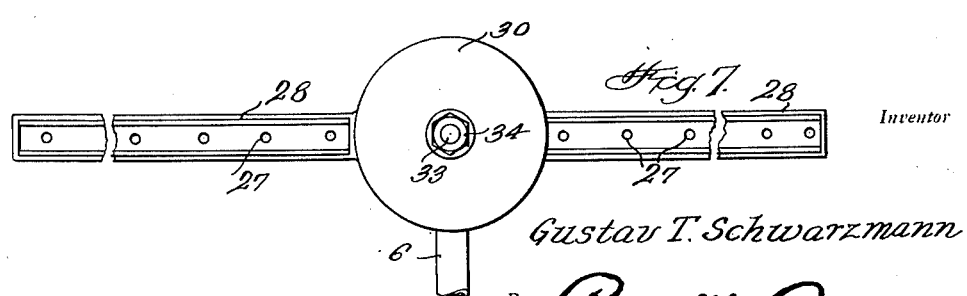

Patented May 26, 1953

2,639,455

UNITED STATES PATENT OFFICE 2,639,455

ROTARY WINDSHIELD WIPER

Gustav T. Schwarzmann, Washington, D. C.

Application October 3, 1947, Serial No. 777,718

1 Claim. (Cl. 15—250.4)

The present invention relates to windshield wipers of the rotary type, the principal object of the present invention being to provide a rotary windshield wiper for automobiles, busses, streetcars and other vehicles wherein means is provided for delivering hot air against the windshield during the operation of wiping the same.

Another object of the invention is to provide a windshield wiper actuated by fluid pressure, the fluid probably being hot air, which after exerting its force in actuating the wiper, escapes to contact and warm the windshield to facilitate the cleaning thereof and to prevent freezing in low temperature weather.

Still another object of the invention is to provide a rotary type windshield wiper which can be raised to operating position conveniently and which can be just as conveniently lowered to an out of the vision position when not in use.

A further object of the invention is to provide a rotary type of windshield wiper wherein the parts are of simple and inexpensive construction permitting the manufacture thereof as well as the maintenance thereof at low cost.

These and various other objects and advantages of the invention will become apparent to the reader of the following description.

In the drawings:

Figure 4 is a fragmentary vertical sectional view through the windshield and hood of a conventional automobile, showing the windshield wiping apparatus installed.

Figure 5 is a cross section of one of the wiping arms taken substantially on line 5—5 of Figure 1.

Figure 6 is a top plan view of one of the wiping units with one of the arms fragmentarily and sectionally shown.

Figure 7 is a fragmentary rear elevational view of one of the wiping units.

Figure 1:
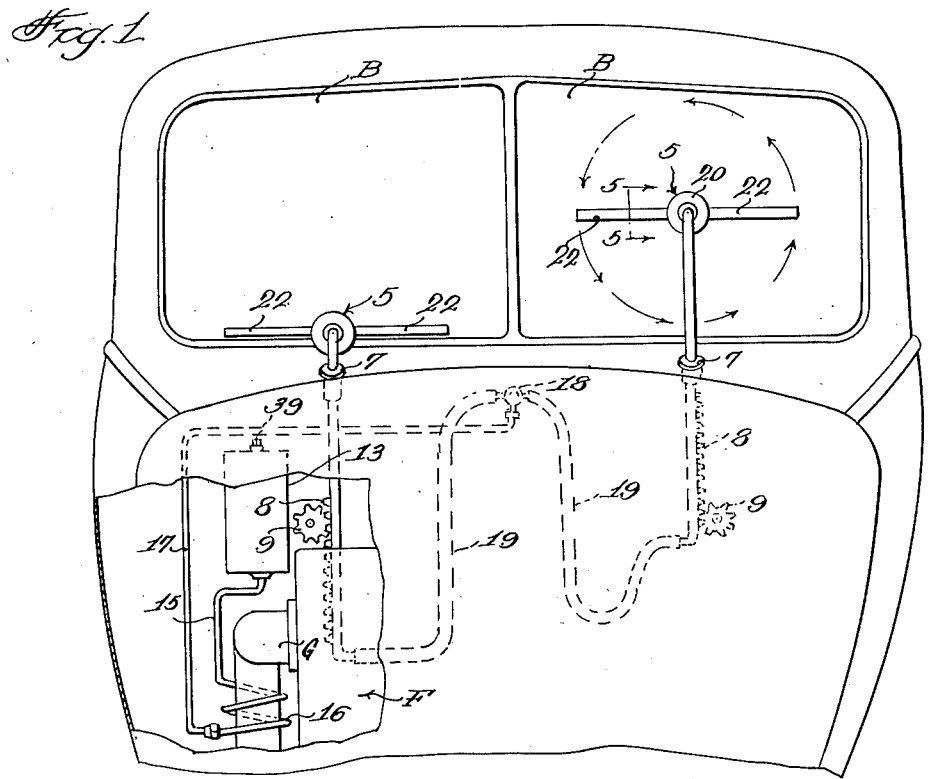
Figure 1 is a fragmentary cross sectional view through the hood portion of an automobile, showing diagrammatically certain parts of the apparatus and in front elevation, the two rotary wiping units.

Referring to the drawings wherein like numerals designate like parts, reference character A denotes the body of an automobile or other vehicle having front windshield panes B. Reference character C denotes a vehicle hood which at its rear end is partly supported by cowl construction D and downwardly from this is located a cowl or dash wall E. A conventional internal combustion engine is generally referred to by reference character F and this has an exhaust pipe G.

In carrying out the present invention a pair of improved units are provided and are noted by numerals 5, 5 one for the right windshield pane and the other for the left.

Each of the units 5 includes a substantially vertical tube 6 slideable on a plane parallel with respect to its corresponding windshield pane B and through a corresponding guide bushing 7 in the cowl structure D.

A portion of the tube 6 below the corresponding bushing 7 is provided with rack teeth 8 with which the gear 9 meshes, this gear 9 being keyed or otherwise secured to an inclined shaft 10 journaled through a bearing 11 on the dash wall E, the shaft end extending rearwardly through the wall E and provided with a crank or handle 12 at its rear end, within easy reach of the driver, so that by rotating the shaft 10 and gears 9, the corresponding unit 5 can be raised or lowered as desired.

Inasmuch as hot air under pressure is used for the units 5, a tank 13 is suitably mounted as by a bracket 14 on the engine F or any other part of the vehicle found most suitable, and from the tank 13 a pipe 15 extends to a coil 16, convoluted about the exhaust pipe G and from there a pipe extends upwardly to a point just under the cowl structure D, this last pipe being denoted by numeral 17.

A suitable coupling 18 is provided between the upper end of the pipe 17 and a pair of hose sections 19, 19 these hose sections 19, 19 connecting the lower ends of the wiper unit tubes 6. (See Figure 1.)

In the matter of each unit 5, the upper end of the corresponding tube 6 is disposed rearwardly and at right angles to the corresponding windshield pane B where it serves as a stationary shaft for the corresponding rotary assembly, the assembly consisting of an annular case 20 having a peripheral wall 21 from which radiate, a pair of arms 22, 22 of hollow construction, the outer ends of these arms being closed as at 23, excepting for small outlet openings 24 through which hot air can exhaust.

Spaced inwardly from the peripheral wall 21 is an annular wall 25, defining an annular chamber 26, the wall 25 having a plurality of openings 27 therein, through which the hot air can pass from the inside of the case 20 and eventually into the hollow arms 22, being further seen that the rear side to the arms 22 are formed with a plurality of openings 27 matching like openings in a double squeegee 28, the latter of course being in contact with the corresponding windshield pane B, so that when the rotary assembly is in operation the windshield will be wiped by the squeegee, while at the same time hot air contacts the windshield pane to maintain the latter warm and free of the accumulation of ice, snow and other conditions that prohibit clear vision.

The case 20 has a screwed-in removable rear wall 30 formed with spanner wrench receiving recesses 31. The case 20 and also the rear wall 30 have openings for receiving the laterally bent upper end portions of the tube 6 which defines the shaft 32, the rear end being reduced and threaded as at 33 and a nut 34 on the threaded portion 33 can be tightened in place to provide a stop against rearward displacement of the case, holding the case in proper position with respect to a circumferential flange 35 on the forward portion of the shaft 32.

Figure 2:
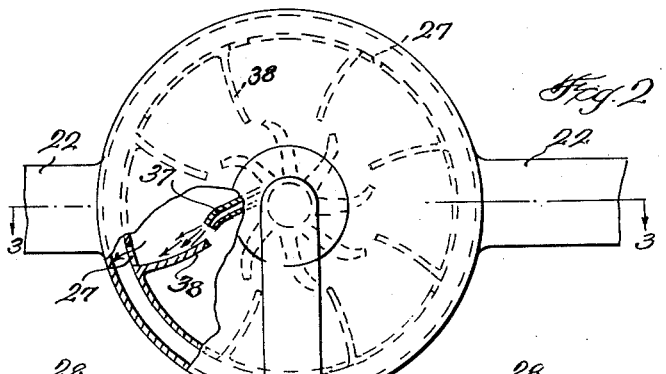
Figure 2 is a fragmentary enlarged front elevational view of one of the wiping units.
Figure 3:
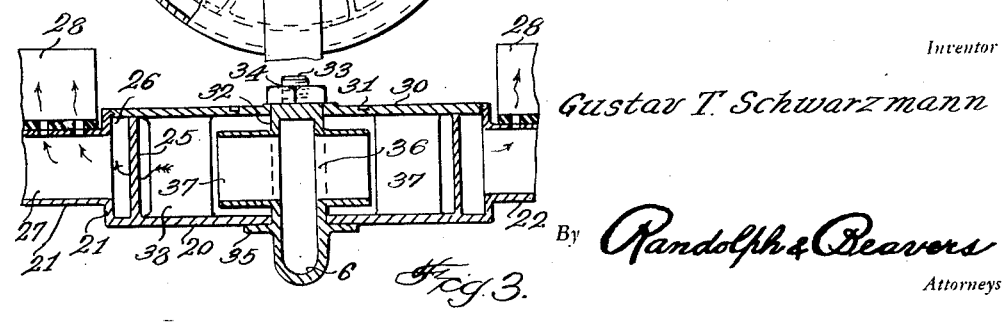
Figure 3 is a sectional view taken substantially on line 3—3 of Figure 2.

The shaft 32 has a plurality of slits 36 formed therein and projecting from the shaft 32 at each of the slits 36 is a narrow jet nozzle 37, preferably curved in the manner shown in Figure 2 so as to direct a stream of hot air against complemental curved vanes 38 projecting inwardly from the annular wall 25.

As to the structure, Figure 4, the tank 13 is supplied with air under pressure from a suitable pump (not shown), by way of a pipe 39.

In the use and operation of this apparatus, the driver first elevates one and then the other of the units 5 by rotating the corresponding handles 12 which of course drives the pipes 6 upwardly by means of the rack and gear arrangement 8, 9.

When the units 5 have been properly operated to an elevated position, the driver can then actuate a control 40 which opens a valve in the coupling 18 and permits air under pressure to pass from the tank 13 by way of the coil 16 to the pipe 17 and from there by way of the hose sections 19, 19, to the pipe 6.

The hot air under pressure discharges into the case 20 from the jet 37 and the impingement of the air streams against the vanes 38 causes the case 20 to rotate on the stationary shaft 32.

Thus the rotary assemblies are rotated by the pressure of the air and the force of the streams of hot air passing from the jets onto the vanes 38, the air thus after acting on the vanes 38, passing through the openings 37 in the annular wall 25, and into the annular chamber 26, where it eventually passes into the hollow arms 22 and out through the openings 27, 24, heating the windshield, as the squeegees wipe the same.

When the use of the units are no longer desired, they are simply lowered to the position as shown to the left of Figure 1 by rotating the handles 12. (See Figure 4.)

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A windshield wiper for vehicles comprising a pipe, an air pressure line to the pipe, a case rotatably mounted upon the pipe, windshield wipers carried by the case, vanes in the case, and jets projecting from the pipe for delivering air under pressure against the vanes to rotate the case and wipers, said case being provided with laterally disposed arms, said wipers being carried by the arms, said arms having openings therein and being in communication with the case so that air can pass therethrough and onto a windshield against which the wipers operate, means for heating air supplied by the pipe, and means for lowering and raising the pipe consisting of rack teeth on the pipe, a gear meshing with the rack teeth, a shaft carrying the gear and extending inwardly of said vehicle to a point convenient to the operator thereof, and a handle at the inner end of said shaft for rotating the same.

GUSTAV T. SCHWARZMANN.

References Cited in the file of this patent
UNITED STATES PATENTS

| Number | Name | Date |
|---|---|---|
| 1,650,922 | Worthington | Nov. 29, 1927 |
| 1,755,059 | Gallagher | Apr. 15, 1930 |
| 2,130,957 | Kingsley | Sept. 20, 1938 |
| 2,181,066 | Rau | Nov. 21, 1939 |
| 2,239,754 | Marti | Apr. 29, 1941 |
| 2,268,253 | Hill | Dec. 30, 1941 |
| 2,271,225 | Heffernan | Jan. 27, 1942 |